Jan. 4, 1927.

M. J. HOFFMAN

POULTRY NEST

Filed Sept. 21, 1922

Inventor

MILTON J. HOFFMAN.

Attorney

Jan. 4, 1927. 1,613,171
M. J. HOFFMAN
POULTRY NEST
Filed Sept. 21, 1922  2 Sheets-Sheet 2

Inventor
MILTON J. HOFFMAN.
Attorney

Patented Jan. 4, 1927.

1,613,171

UNITED STATES PATENT OFFICE.

MILTON J. HOFFMAN, OF AKRON, OHIO.

POULTRY NEST.

Application filed September 21, 1922. Serial No. 589,589.

This invention relates to poultry raising and has special reference to poultry nests.

More particularly the invention relates to a combined culling, trap and setting nest.

It is a well known fact that, in order to raise poultry successfully, care must be taken to eliminate those fowls which serve no useful purpose in producing financial returns. For instance, in raising chickens the successful breeder must eliminate those hens whose egg laying qualities do not attain a certain well recognized standard. This is necessary both in raising chickens for the sale of eggs and in breeding chickens since the progeny of hens which are not good layers are extremely apt to be poor layers themselves and since, if a hen kept for egg raising purposes does not lay a certain number of eggs in a given time the cost of feeding the hen becomes greater than the returns resulting from it and the hen looked upon as an egg producing machine, is operated at a loss. In consequence of this it is necessary that the hens which are not productive should be sold or used for table purposes, and these hens accordingly must be culled out.

One important object of the present invention is to provide an improved arrangement of poultry house and nest by the use of which this culling process may be readily effected.

The invention has for its object further, to provide simple and efficient means enabling the nest to serve as a trap nest, and one in which interferences with the setting hen may be readily prevented, and at the same time allow the setting hens to have free access to their nests without being disturbed by fowls that are not setting, and to serve as a combined culling, trap, and setting nest.

A further important object of the invention is the provision of an improved hen's nest or poultry nest having an entry and an exit distinct from each other and each provided with a closure which may be arranged for operation by the passage of a hen through the nest or which may be arranged entirely for manual control as desired.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and :—

Figure 1:
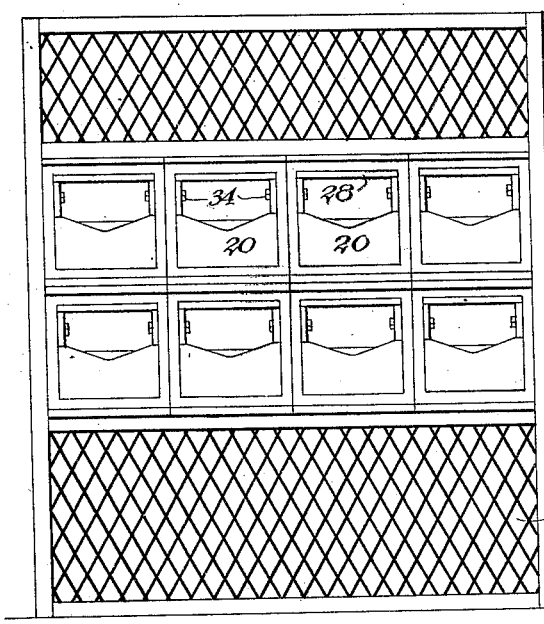
Figure 1 is a front elevation of a portion of the partition in a poultry house showing the position of the nest therein.
Figure 2:
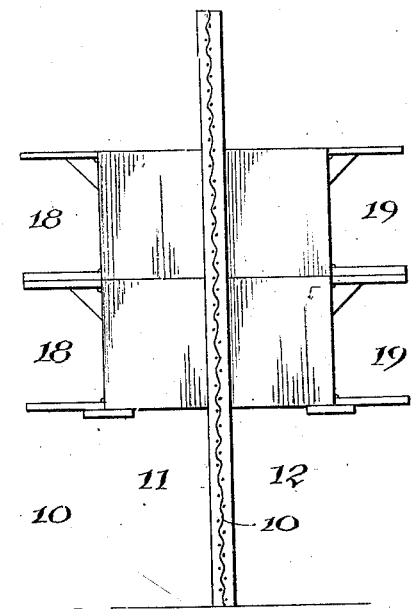
Figure 2 is a side elevation of this portion of the partition.
Figure 3:
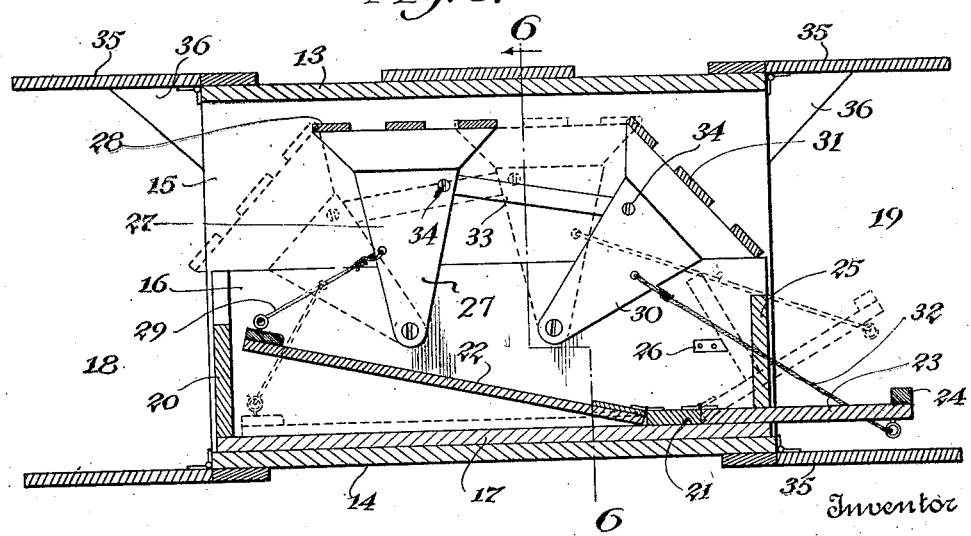
Figure 3 is a longitudinal median section through the improved nest in its arrangement as a culling nest, the nest being shown with the moving parts in position for the entry of the hen in full lines and in position for the exit of the hen in dotted lines.
Figure 4:
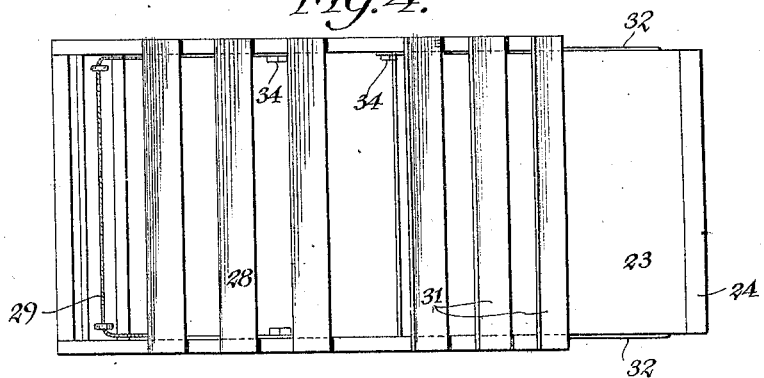
Figure 4 is a plan view of the interior portion of the nest.
Figure 5:
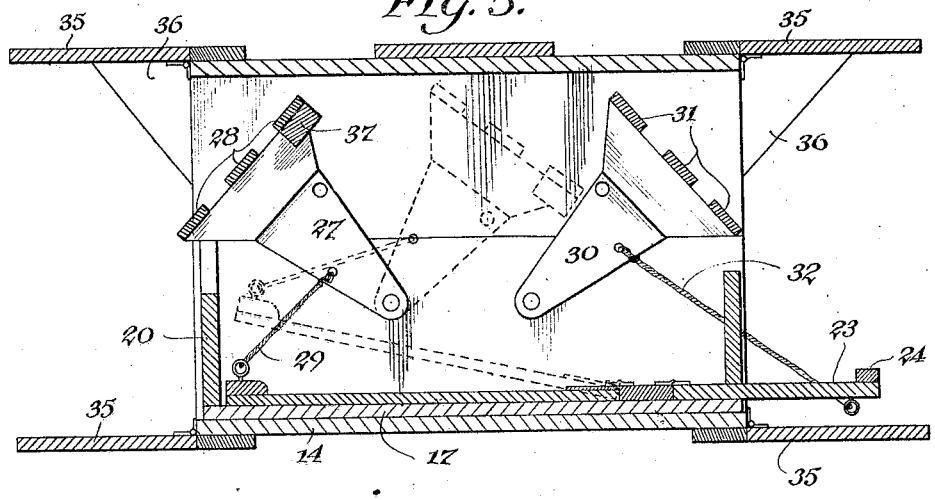
Figure 5 is a view similar to Figure 3 but showing the nest arranged as a trap nest, the position when the hen is trapped being shown in full lines and the position to receive the hen being shown in dotted lines.
Figure 6:
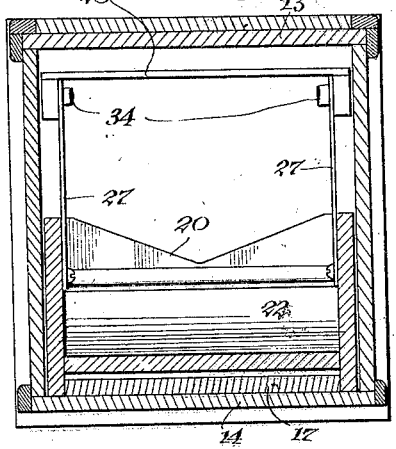
Figure 6 is a section on the line 6—6 of Figure 3.

In the embodiment of the invention herein illustrated there is shown a partition 10 which is intended to be arranged across the poultry house so as to divide the same into two compartments, 11 and 12, the compartment 11 being what may be termed the general compartment while the compartment 12 is the culling compartment. Extending through this partition is a series of nest boxes each having a top 13, bottom 14 and sides 15. Within these nest boxes it is preferred to provide a sliding or removable nest having sides 16 and a bottom 17. One end of this nest is termed the entry end and is indicated at 18 while the exit end is indicated at 19. The entry end is partially closed by a wall 20 which extends up from the bottom 17. Across the bottom 17 extends a strip 21 which is positioned to the end 19 and to this strip is hinged one edge of a false bottom 22. Also to the strip 21 is hinged one end of a perch board 23 carrying a perch 24 and provided with an upstanding wall 25 corresponding, when the perch board is depressed as in full lines in 23 to the wall 20. Movement of the perch board is limited in one direction by means of a stop 26 secured to the side 16. Adjacent the end 18 a pair of arms 27 are pivotally connected at their lower ends to the sides 16 and at the upper or free ends of these arms there is supported a closure preferably formed of slats 28. Flexible strands 29 connect the free end of the board 22 with these arms 27, and when the nest is arranged as at Figure 3 the lengths of these strands is such that whenever the arms 27 are moved to open the end 18, the nest board 22 will be raised as shown in full lines in Figure 3.

Similarly at the end 19 there is provided a pair of arms 30 carrying a slot closure 31. These arms 30 are connected to the board 23 by flexible strands 32 and whenever the arms are raised to open the exit end of the nest the perch board will assume the position shown in dotted lines of Figure 3. The arms at each side of the nest are connected by a detachable link 33 which is secured to these arms by a screw bolt 34 at each end.

It will be observed that while for the sake of cleanliness and convenience the various parts have been connected to a movable inner nest that these parts may be connected directly to the sides 15 and bottom 14 if desired. Therefore, in referring to the nest in the claims the sides 15 and 16 are referred to as one and the same element as are the two bottoms 14 and 17.

The position of the entry ends 18 of the nest is on the same side of the partition while the position of the exit ends are all on the opposite side and at each of these ends there are provided upper and lower manually controlled closures 35 which are preferably hinged to the nest and serve as the foot boards. Braces 36 may be used to hold the foot boards open.

As previously stated it is to be remembered that a hen does not seek a nest unless she wishes to lay an egg and that hens do not lay more than one egg in one daylight period. This nest is operated by the hen herself. In starting the operation the entire flock is placed on one side of the partition where they may obtain access to the entry end of the nests. When the hen desires to lay an egg she flies up to the foot board and steps in the nest. The weight of the hen when she is on the board 22 causes movement of the parts from position shown in full lines in Figure 3, to the position shown in dotted lines in that figure. Thus the normally opened closure at the entry end is closed and a normally closed closure at the exit end is opened. At the same time the perch board is raised. After the hen has laid its egg it leaves the nest and perches momentarily on the perch 24. Consequently its weight depresses the perch board and the parts assume their normal position as shown in full lines in Figure 3. The hen now is in the other compartment of the house and cannot return to the main compartment through the nests. It is to be understood that the poultry raiser places identifying marks such as bands, or the like, on his hens so that he may know one hen from the other. At the end of the day the raiser goes into the compartment 12 and notes the hens that have laid during that day after which he returns them to the main compartment. Now, it will be observed that with this arrangement, a comparatively small number of nests will serve a large number of hens because they only remain in the nest a short time and upon leaving it open it for another hen.

After repeating this operation for several days it will become plain to the poultry raiser that certain of the hens are layers while the others are merely boarders and he can eliminate the like in any way desirable.

If it be desired to utilize the nest as a trap nest it is merely necessary to disconnect the links 33 and drop the exit closure. In this case it is sometimes found advisable to put a supplemental weight 37 on the entry closure so that the false bottom 22 may be held open. Under these conditions when the hen enters the nest she closes the entry closure as previously described but she does not open the exit closure. Consequently the hen remains in the nest until the attendant releases her.

Again when it is desired to set a hen the strands 32 are disconnected. This leaves the entry closure at all times closed and the exit closure at all times open. The hen can then have entry and exit from the compartment 12 and can thus get exercise without danger of another hen laying an extra egg in the nest when she leaves the thing.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:—

1. In a poultry nest, a body closed at its top, bottom and sides and open at its ends, a normally open closure at one end of said body, a normally closed closure at the other end of said body, means to connect said closures to cause the same to operate in synchronism, a false bottom in said nest hinged at one end and normally having its other end raised, an operative connection between said false bottom and the normally open closure, a tilting poultry perch independent of said false bottom adjacent the other end of said nest exterior thereto and an operative connection between said perch and the normally closed closure.

2. In a poultry nest, a body closed at its top, bottom and sides and open at its ends, one of its ends constituting an entry end and the other end constituting an exit end, a pair of arms each having one end pivoted to the lower side portion of the body adjacent the entry end, a closure extending across the body and carried by the free ends of said arms, a false bottom hinged to the body at the exit end thereof, and flexible strands connected to the arms and the free end of the false bottom and arranged to hold said free end raised upon the closure being moved to open position.

3. In a poultry nest, a body closed at its top, bottom and sides and open at its ends, one of its ends constituting an entry end and the other end constituting an exit end, a pair of arms each having one end pivoted to the lower side portion of the body adjacent the entry end, a closure extending across the body and carried by the free ends of said arms, a false bottom hinged to the body at the exit end thereof, and flexible strands connected to the arms and the free end of the false bottom and arranged to hold said free end raised upon the closure being moved to open position, a second pair of arms arranged similarly to the first pair and carrying an exit closure, a perch board having one edge hinged to the bottom at the exit end, a perch on said board, flexible strands connecting the perch board and said second pair of arms, and detachable links connecting the arms of the first pair with respective arms of the second pair.

In testimony whereof I affix my signature.

MILTON J. HOFFMAN.